United States Patent [19]

Saint-Laurent

[11] Patent Number: 5,680,630
[45] Date of Patent: Oct. 21, 1997

[54] COMPUTER-AIDED DATA INPUT SYSTEM

[76] Inventor: Jean de Saint-Laurent, 47, rue de la Gaîté, 94170 Le Perreux, France

[21] Appl. No.: 427,618

[22] Filed: Apr. 24, 1995

[30] Foreign Application Priority Data

Apr. 25, 1994 [FR] France ................... 94 04940

[51] Int. Cl.⁶ .................................. G06F 9/00
[52] U.S. Cl. ........................................ 395/796
[58] Field of Search ............... 364/419.15, 419.09, 364/419.11; 395/794, 796

[56] References Cited

U.S. PATENT DOCUMENTS

| | | | |
|---|---|---|---|
| 4,744,050 | 5/1988 | Hirosawa | 369/900 |
| 5,123,088 | 6/1992 | Kasahara et al. | 395/159 |
| 5,305,205 | 4/1994 | Weber et al. | 364/419.1 |

FOREIGN PATENT DOCUMENTS 03131960  6/1991  Japan.

OTHER PUBLICATIONS

Proceedings Of the 10th Annual Conference On Rehabilitation Technology (RESNA'87) Jun. 1987, J.A. Bentrup, pp. 121–123.

IEEE Expert, 8(6), pp. 27–38, Dec. 1993, R. Uthurusamy. "Extracting Knowledge from Diagnostic Databases".

*Primary Examiner*—Phu K. Nguyen
*Attorney, Agent, or Firm*—Michael N. Meller

[57] ABSTRACT

A system for saving time when keyboarding data by building a primary dictionary and generating a functional dictionary from the primary dictionary by dividing each article of the primary dictionary into an initial context part and a final completion part. Offering, selecting and automatically inserting "completions" data occurs when the last input data coincides with one of the contexts of the functional dictionary. The initial articles of the dictionary are character chains independent from words delimiters. A second module, intended to be incorporated into a word processor, display and insets the useful completions with the best possible comfort for the user.

9 Claims, 12 Drawing Sheets

| | i | k | LA | NP/NF | E |
|---|---|---|---|---|---|
| 1 | | i | 2 | 10/3 | 55 |
| 2 | | o | 5 | 3/3 | 27 |
| 3 | | d | 12 | 5/4 | 20 |
| 4 | | e | 20 | 1/1 | 8 |
| 5 | | t | 8 | 2/2 | 10 |
| 6 | | d | 11 | 1/1 | 9 |
| 7 | | n | | 0/0 | 8 |
| 8 | | a | 10 | 1/1 | 7 |
| 9 | | e | | 0/0 | 3 |
| 10 | | s | | 0/0 | 7 |
| 11 | | i | | 0/0 | 9 |
| 12 | | a | 16 | 2/2 | 7 |
| 13 | | o | | 0/0 | 6 |
| 14 | | e | 18 | 1/1 | 5 |
| 15 | | r | 19 | 0/0 | 2 |
| 16 | | c | | 0/0 | 4 |
| 17 | | g | | 0/0 | 3 |
| 18 | | n | | 0/0 | 5 |
| 19 | | e | | 0/0 | 2 |
| 20 | | n | | 0/0 | 8 |

MD0 TABLE (left side):

| 1 | 4 | | d | a | c |
| 2 | 3 | | d | a | g |
| 3 | 5 | | d | e | n |
| 4 | 6 | | d | o | |
| 5 | 2 | i | d | r | e |
| 6 | 8 | | e | n | |
| 7 | 9 | | o | d | i |
| 8 | 8 | | o | n | |
| 9 | 7 | | o | t | a s |
| 0 | 3 | | o | t | e |

MON STACK: LMD / LC / NF

MD TABLE

COMPUTER-AIDED DATA INPUT SYSTEM

TECHNICAL FIELD

This invention is in the general field of manual data input with a keyboard and a screen, and especially in the field of saving time by reducing the number of keystrokes required by the input of a given text.

BACKGROUND OF THE INVENTION

There are three known methods aiming at saving time when entering data.

The first one is to use abbreviations, standardized or built by the user, which are later replaced by longer translations. However this technique has the inconvenience of requiring from the user time for the building of his/her own abbreviations and his/her learning them.

The second one is the use of preconstructed forms in which the user has to fill up the blanks. This method is limited to short and standard documents and cannot be of general usefulness.

In the third one, words or phrases are displayed and the user may select the one that fits his/her purpose, if any is fitting, in order to incorporate it into input data. The displayed list may depend on previously entered data. In the prior art systems, these previous data are limited to a finite number of delimited words and/or to the initial letters of a given word. This method requires time for reading the list and selecting an article, and generates visual tiredness.

There remains a need for a system that generalizes and optimizes the third method, functionally associates it to the first one, takes into account the ergonomical requirements and, furthermore, it is given the detailed description of its technical realization.

SUMMARY OF THE INVENTION

The object of the invention is a computer-aided data entry system, more specifically suitable for texts, characterized by stages consisting in:

a) the input and the storage of a "corpus" including at least a data set similar to the data which must be entered b) the building of a primary dictionary extracted from the corpus whose articles are elementary data chains independant from word delimiters, occurring several times in the corpus c) the generating of a functional dictionary by dividing each article of the primary dictionary into a "context" initial part at least and a "completion" final part so that the gain defined as the product of the completion length by the its probability of occurrence in the corpus after the context, would be maximum d) when keyboarding, if the last input data coincide with one of the contexts of the functional dictionary, the operator will be offered the automatic insertion of the corresponding completion into the input data.

Another object of this invention is a method characterized by the fact that if in the building of the functional dictionary several contexts are identical, one only is preserved and associated to a list of completions sorted according to their probability order, these various completions being offered to the operator when keyboarding. In all cases, the choice of the completions is done according to a detailed computation which gives the maximum total gain, the auxiliary keystrokes or other selecting actions being taken into account.

Another object of this invention is a method characterized by the fact that in stage c) an article extracted from the corpus can be divided into several contexts and completions, the articles being divided so that the total gain would be maximum.

Another object of this invention is a method characterized by the fact that in stage c) the value of the gain may be corrected by factors taking into account the time and the attention necessary to the operator to select, accept or reject a completion.

Another object of this invention is a method characterized by the fact that in stage d) the most probable completion is directly inserted after the last typed character and by the fact that a positive act on a command device, for example a board key, is required to delete this insertion.

Another object of this invention is a method characterized by the fact that in stage d) the various completions are offered in succession in order of decreasing probability and that a command device, such as a board key, allows their scrolling.

Another object of this invention is a method characterized by the fact that after the coincidence of the last input data and of a context associated to several completions these completions are displayed and one of them may be selected by a direct selecting device such as a mouse, arrowed keys or a set of keys whose numbers are corresponding to those of the displayed completions.

Another object of this invention is a method characterized by the repetition of stages a), b) and c) with various corpuses containing different data classes and by the selection in a list of the dictionary best suited to the specialty of the input data.

DETAILED DESCRIPTION OF THE INVENTION

Figure 1:
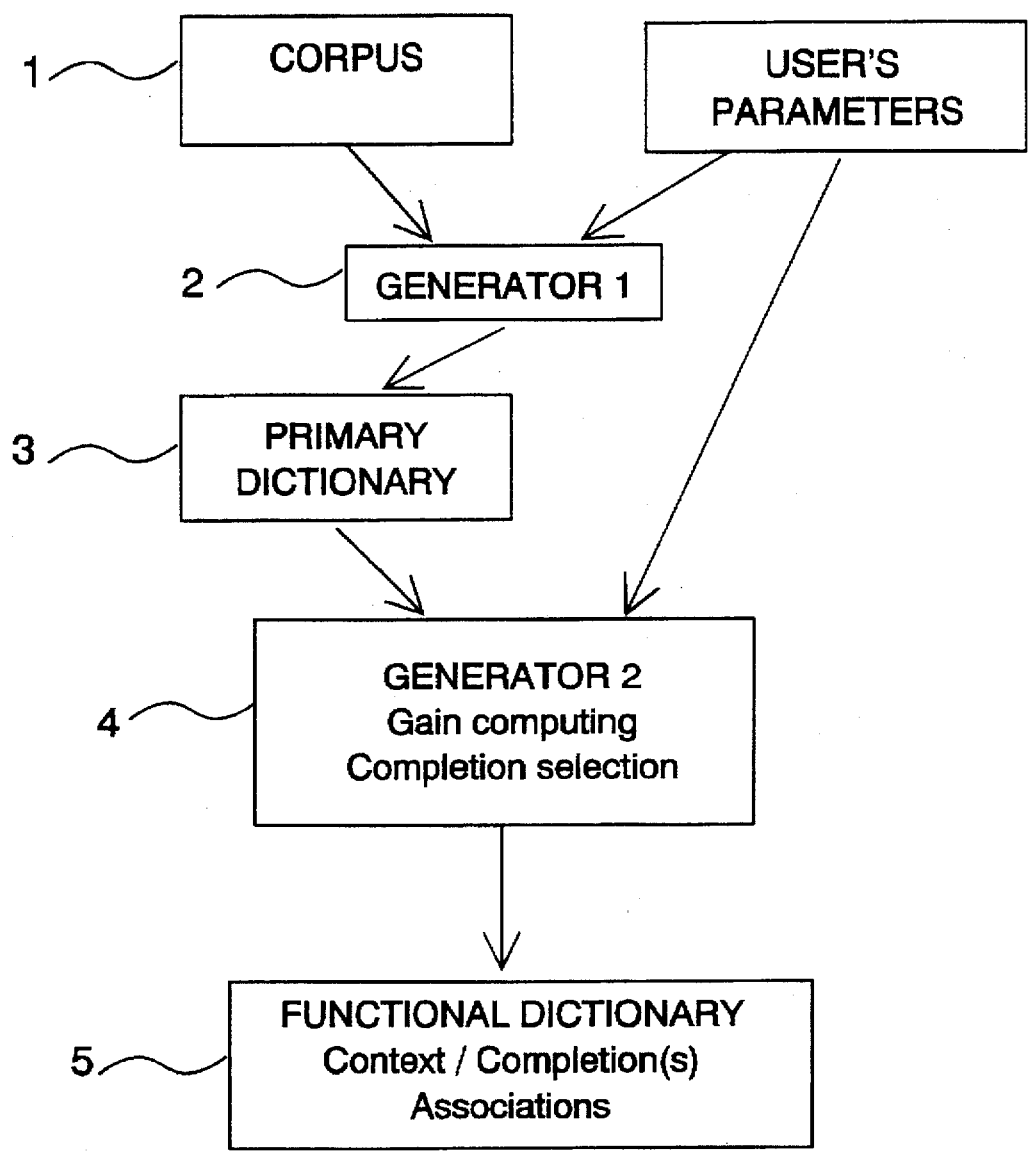
FIG. 1 is a general flow chart of the building of the dictionary.

FIG. 1 shows a general flow chart of an embodiment of the first module of the system, which is the building of a dictionary of original structure.

In step 1, we insert in the device a corpus consisting in data, which is most often a text or a set of texts as near as possible by its vocabulary and phrases to the data which are to be input.

In step 2, we build a primary dictionary 3 of elementary form consisting in articles which are character chains which occur at least S times in the corpus, S being greater than one, without being subsets of articles already present in the dictionary. Let us notice that an article of this dictionary does not depend on the cutting into words and may include spaces or any element being part of the text. An article of dictionary 3 may be for example a part of a word, a word, a sentence portion, one or more sentences; the formal ending of a letter may be an article of dictionary 3.

A count which is the number of the occurrences of the article in the corpus is associated to each article in dictionary 3.

Then we go to 4.

In step 4, we transform the primary dictionary 3 into a functional dictionary 5, giving it the properties and the format needed for its use when keyboarding. In the best case an initial article is cut into two parts: a context part given a tree structure and a completion part given the form of a character chain, the end of the context including a link to the corresponding completion. In worse cases, several completions are associated to the same context; in the worst case, the article is deleted. The corresponding selections, more particularly the cutting place between context and completion, are done according to the exact computation of the gain expressed in saved keystrokes, a keyboarding of the corpus itself by using the system, object of the invention, being assumed. The result of the computing is weighted with coefficients that may be modified by the user in order to take into account the reading and completion selecting time.

As the efficiency of the system strongly depends on the adaptation of the dictionary to the input data, it may be an advantage to build several dictionaries, to store them in a disk memory and to load the one which is the best suited to the class of input data.

Figure 2:
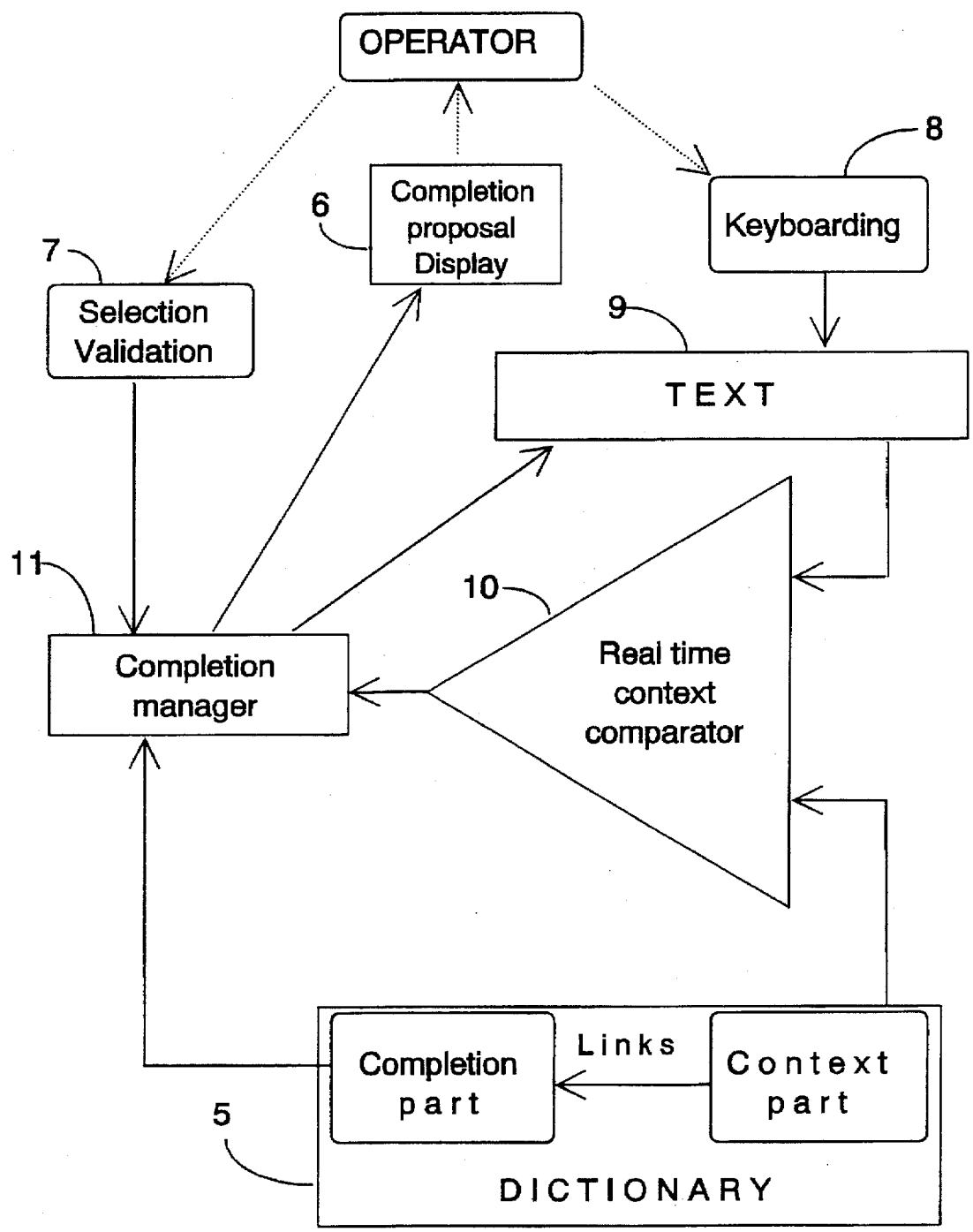
FIG. 2 is a general flow chart of the data input system.

FIG. 2 is a general flow chart of an embodiment of the second module of the system, operating while keyboarding.

In step 8, the operator keyboards conventionally text 9.

In step 10, a part of the system, object of the invention, named context comparator, compares in real time the last input characters with all the contexts present in dictionary 5. If a coincidence is found, we go to 11.

In step 11, a part of the system, named completion manager, extracts from the completion zone of dictionary 5, the completion(s) linked to the identified text and offers it or them to the operator in a way depending on the embodiment; the simplest way is the display of the most probable completion following the previously input data.

In step 7, the operator reacts to the offered completion. Three reactions are possible:

a) the completion being suitable, the operator resumes the input by striking an input data key, which is considered as an implicit validation by the completion manager that keeps on the completion display and insert it in the input data.

b) the identified context is linked to several completions and one of them, which is not the first one, is suitable. Through a technique admitting several embodiments, the operator selects the suitable completion and then is in the same position as in the previous a) case.

c) no completion being suitable, the operator rejects the offer and the displayed completion is deleted.

In a first embodiment, a single scrolling key allows the completion control: striking this key displays one after the other the completions present in the dictionary in order of decreasing probability, continuing the inserted text; after the last one, any completion is deleted.

In a second embodiment, two keys are devoted to the completion control: the previously described scrolling key and a total deletion key. This key is preferentially different from the conventional rear deleting key which may be normally used to delete the end of an accepted completion, character by character.

In a third embodiment, the possible completions, if there are several ones, are displayed in a seperate window as a menu.

The display of a completion may, if preferred, draw the attention of the operator by a buzz and/or a special display, replaced by the current one if the completion is accepted. In some cases, the computing shows that it is an advantage for the operator if a completion is offered to him/her provided that it is not displayed following the already input data, a positive action being requested to insert this completion. A buzz or a separate display is then necessary. The inner corresponding layout is called a "null completion".

A selected completion may totally or partly be a part of the context, such as the keyboarded data; in order to generalize this feature, generator 2 may, if it is productive, cut an article into any number of segments having alternately the context quality and the completion one. A completion foregoing a context will be named "inter-completion".

The system, object of the invention, may set to work conventional abbreviations: when an arbitrary chain, i.e. the code, is input, it is immediately replaced by its translation. In this function, the initial part of the code may be an automatically inserted completion or the translation of another code. This feature is described further on. The code is processed as a context and its translation as a completion including a deleting order of the arbitrary part of the code.

Figure 3:
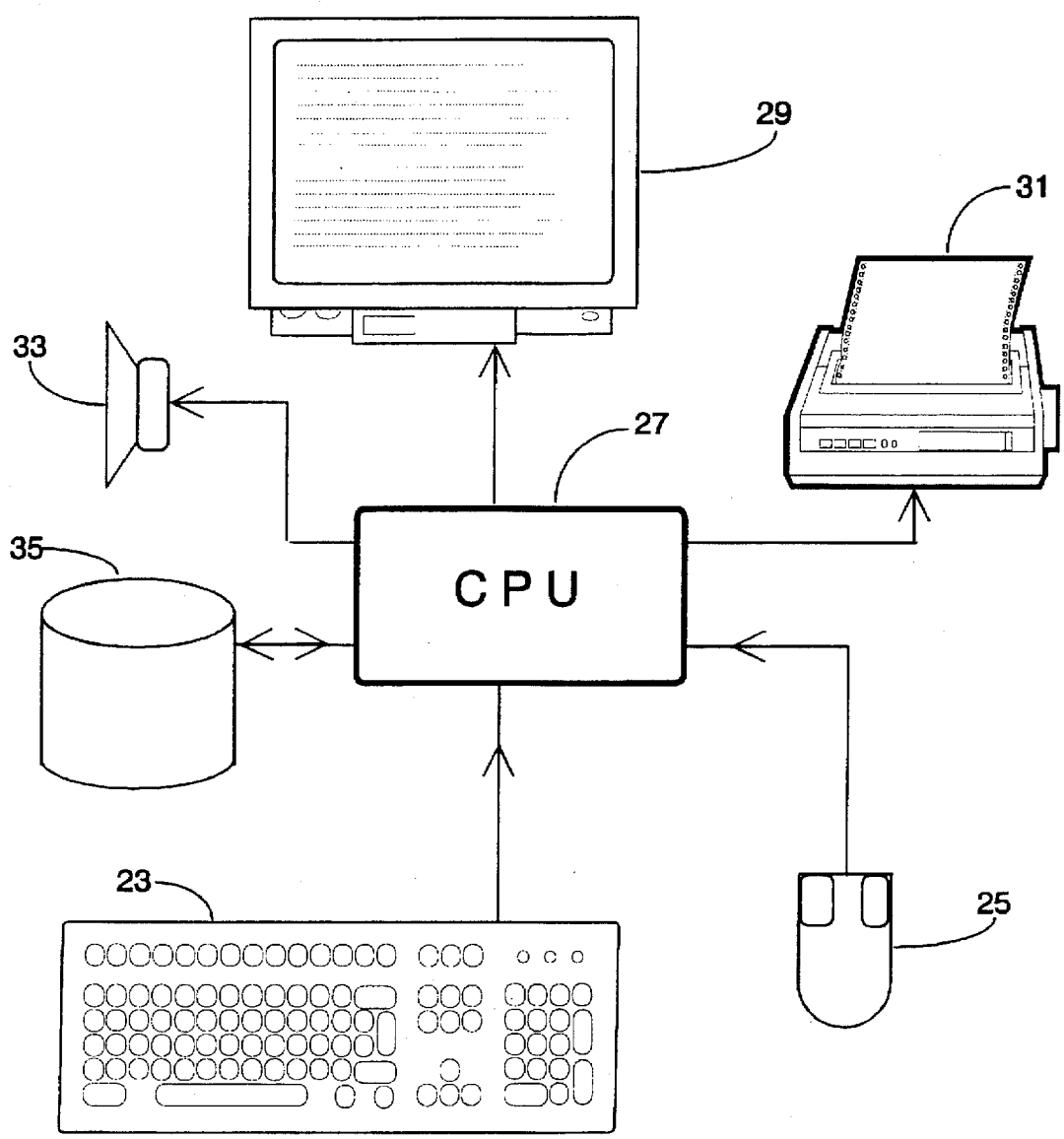
FIG. 3 is a schematic image of a data input device.

FIG. 3 shows a computer-aided data input device fitting the needs of the invention. The work station in FIG. 3 includes a keyboard 23 and a pointer 25, for example a mouse, connected to a central unit 27, for example a microprocessor. The central unit 27 is connected to a visualisation device 29, for example a screen, a printer 31 and favorably a loudspeaker 33. A bulk storage device 35, such as a hard disk, is connected to the central unit 27 by a bidirectional interface.

The system, object of the invention, may be embodied in the form of three components: a constructing dictionary autonomous program, an input module realized as a portion of a word processing system and a set of data, texts and dictionary files. Here comes underneath an example of bringing it into operation, using the common structure of an operating system with files and repertories.

The texts belonging to the same class are stored in the proper repertory; this repertory is renewed when deleting the oldest texts or by the user's deliberate selection. The dictionary linked to a repertory is built by taking as the corpus the result of the concatenation of its text files; this process is assumed by the generator, whereas the user names the repertory and gives the construction order. The word processing system is ordinary, the input module appearing nothing as but a peripheral handler supplying keyboard codes.

Now, we are going to describe the preferred forms of technical features, principles of computation, data structures and algorithms which allow an efficient realization.

The dictionary building will be described by referring to FIGS. 4 to 12. It is advantageous to build the functional dictionary into a tree structure, and it is advisable to reconvert its completion part into a list form in order to save memory requirement.

A text consists of coded elements called "items" which might be letters, spaces or signs; an item has a distinctive "color": for instance we would say that a text in which the letter 'e' is written 36 times includes 36 color 'e' items. In the given examples, the "space" color is depicted by the lower horizontal hyphen '_'. Consecutive items form a "chain". A "corpus" is a set of texts; we generally form a corpus with texts having something in common, such as the vocabulary, an author, or a special field.

The system, which is the object of the invention, uses "dictionaries", different from common dictionaries and taking several forms. A dictionary is extracted from a corpus. In its primary form it contains "articles" which are chains met with more than once in the corpus; the articles are independant from the dividing into words, they can contain spaces or signs. The articles are classified according to a law similar to the usual alphabetical order. The set of articles beginning with the same color is a "rubric"; the initial color is the "root" of the rubric. Each article is associated with a count which is the number of occurrences of the article in the corpus.

Module 1, FIG. 1, extracts from the corpus the primary dictionary having the usual structure of a list of alphabetically classified articles. This dictionary does not contain words only, but any chain pattern existing at least S times in the corpus without being a part of a chain already present in the dictionary. Each rubric is characterized by the color of its root, corresponding to a code value. An index table gives the address or subscript of a rubric as a function of the code which may itself be used as a subscript in the index table; the same feature is used in the successive forms of the dictionaries.

The structure of the following dictionary is rightly represented by a tree set (one tree for a rubric). A tree is built according to the three following conventions:

a) The tree consists of orientated nodes. The first node is called "root". Contrary to the natural orientation, the root is represented at the top, the branches growing downwards.

b) A node can beget any number of sons; it is called "father" if it gets at least one son; if not, it is said to be "terminal".

c) A color present in the original corpus and a count are associated with each node.

When processing the first article, each item gives a node; these nodes follow down from father to son according to the writing of the article.

The articles are added according to their order in the primary dictionary. In order to be added, an article must be compared, item by item, to the previous one; a new node is created the first time you come upon a difference.

Let us consider for instance the consecutive articles "collar", "collect" and "collet". The corresponding part of the tree will contain once the descending sequence c, o, l, l; the last node 'l' begets two sons 'a' and 'e'; 'a' begets 'r' which is terminal; 'e' begets two sons 'c' and 't', etc.

The case of two articles one of which being the prolongation of the other requires a special convention. Let us take the example of "project" and "projector" existing in the primary dictionary. The final 't' of "project" will be considered as the father of two nodes: a 'o' node for projector and a "null" terminal node codified '%' intended to signify in the tree representation that "project" is an article of the primary dictionary.

Thus, each primary article gives birth to a terminal node whose count is the one of the article; the count of any other node is equal to the sum of the counts of its sons and is calculated upwardly.

The procedure named "ALFAR" converts the primary dictionary into a tree.

A rubric of the primary dictionary is formalized as a table MD0; an article of MD0 contains:

a MD0(j,E) count any number of MD0(j,h) items j is the rank or subscript of the article in the rubric; h is the rank or subscript of the item in the article.

Articles are sorted according to the value of the items, corresponding to the alphabetical order, in ASCII coding.

In its practical realization, MD0 may be a list of items with delimiters, which requires less memory and does not limit the length of the article.

The tree is coded in an output MD table containing a file card per node. The cards must be constructed according to the bidimensional structure of the tree, tree rules being stated as such:

a) the first card concerns the root b) the cards concerning the nodes generated by the same father are always consecutive and form a "family".

c) after a family, one places the card concerning the node which is not yet coded and situated the farthest to the left in the tree.

One MD card contains four terms:

a) k, node color b) NF, number of sons c) E, count d) LA, the link, subscript or address of the first son.

In a family, the sons that have been extracted from the primary dictionary according to the alphabetical order are sorted once more according to their decreasing count.

Figure 8:
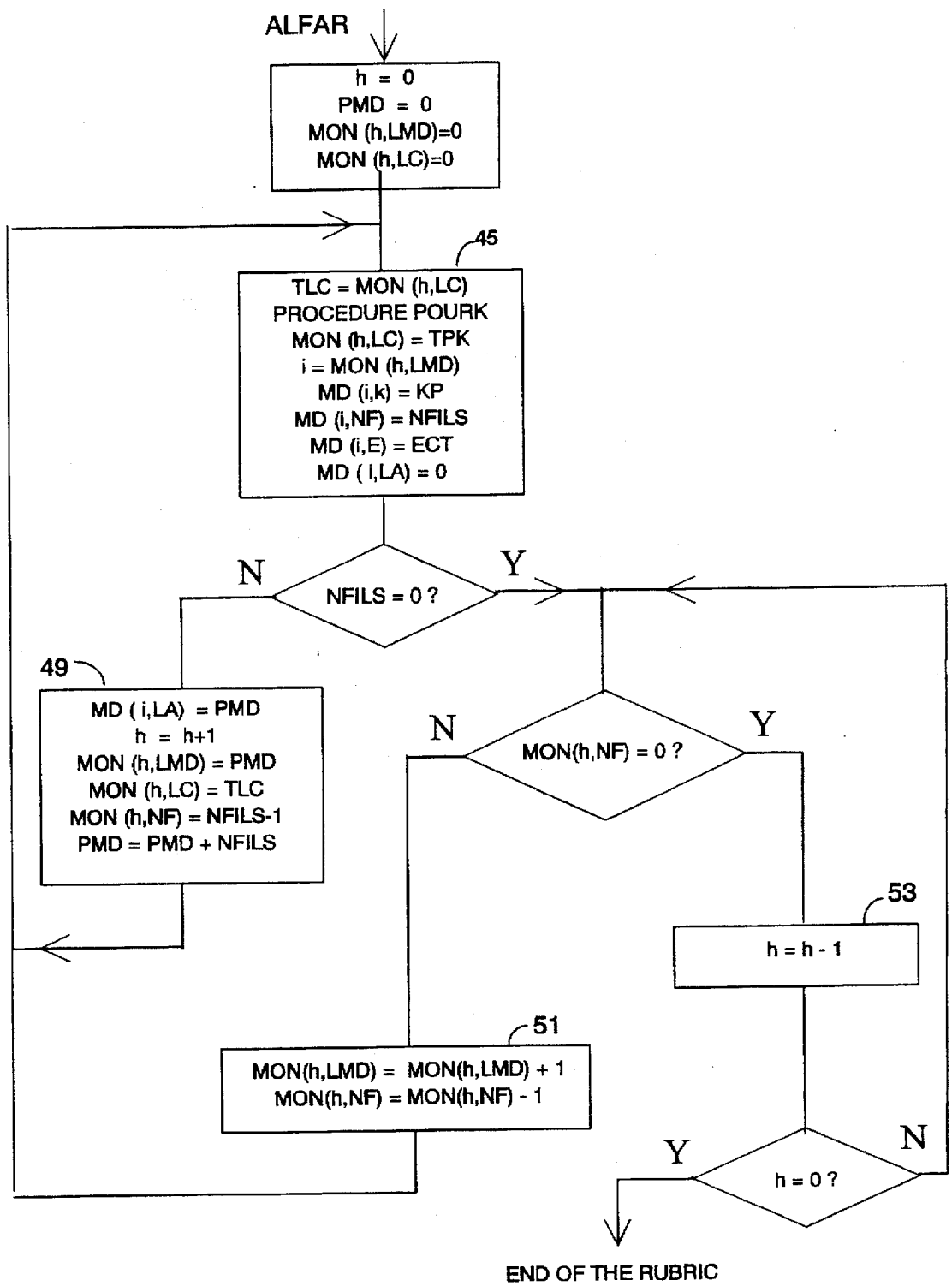
FIGS. 8 to 12 are detailed flow charts of the building of the dictionary.

The general flow chart of ALFAR is shown in FIG. 8.

The construction of the tree requires the generator to keep the track of the awaiting branches. This part is played by an editing MON table which has a stack structure.

MON contains a card for each h level of the tree. A level corresponds to the number or rank of an item in an article; conventionally, the root is at the zero level. Therefore, the number of cards to reserve in MON corresponds to the maximal length of an article.

A MON card contains three terms:

a) LMD, link to the MD output table b) LC, link to the MD0 input table c) NF, number of non-coded brothers.

A j=MON(h,LC) term is the address or subscript of the MD0(j,h) item.

The first task is to identify the sons of a node. Let us consider, for instance, a level 2 color C node, descending from A,B; the primary dictionary contains NP articles beginning with ABC. NP is the number of buds in the C node. Several buds may have the same color, such as D in the ABCDEF, ABCDEG, ABCDF articles; the buds of the same color correspond to an only son. The number of node C level h=2 NF sons is the number of level h=3 distinct colors in a set of equal articles down to the h level, i.e. beginning with ABC.

This task is done through the POURK procedure which has to delimitate and compare the consecutive articles in MD0.

A node being explored, you have to:

a) fulfil a corresponding card in MD (FIG. 8, step 45).

b) if the node has sons, reserve in MD the storing place for their cards, then process the first son (step 49).

c) if the node has neither son nor brother, go up the tree through decrementing the h level down to the identification of the awaiting brother and process it (step 53).

e) when we are back to the h=0 level, the tree is over. Whe have to process the null sons as well.

Let us consider an extract from the primary dictionary, in the A rubric: AB, AC, ACD.

At level 1, the AB article will give a terminal color B node; in its card, NF=0.

At the same level we process the C node, B's brother. The POURK procedure identifies C as terminal in AC and the existence of an ACD article equal to AC in its first items;

then POURK gives NFILS=2; ALFAR creates a card for C with NF=2, goes down to level h=2 and resumes the exploration at article AC.

POURK takes note that the AC article has no item at level 2; it assigns NFILS=0 and KP=0; this is the characterization of a null son; ALFAR creates the card of this null son and then processes its brother D.

Figures 6, 7:
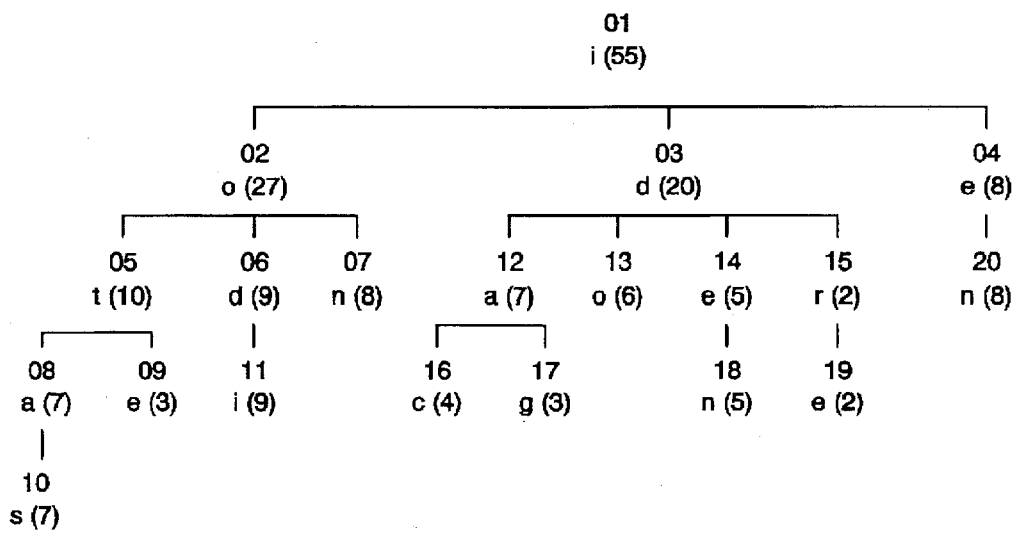
FIG. 7 shows a re-sorted tree structure of a dictionary.

Not depicted in the algorithm, the re-sorting is done in step 45. The card of the father of a node contains a NF number of sons and a corresponding space is reserved in MD. The sorting of the cards according to decreasing order is done by shifting and inserting inside that reserved space; the re-sorted tree is shown in FIG. 7.

Figure 9:
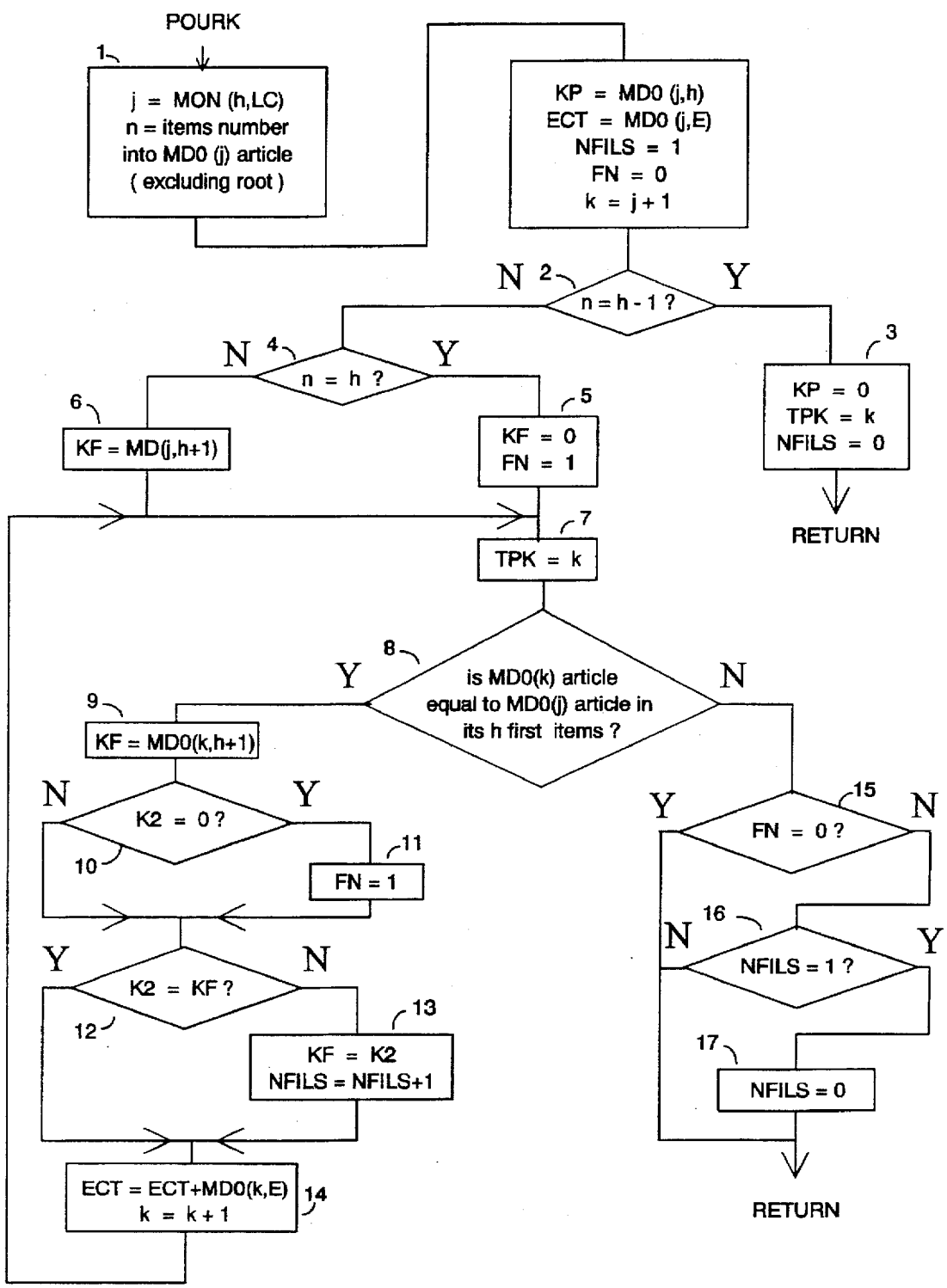

FIG. 9 is a flow chart of the POURK procedure; the articles of the MD0 primary dictionary are supposed to be subscripted.

Practically, MD0 may be a table of bytes coding items; the first byte of an article is its count, weighted if necessary to avoid an overflow; the second one is the second item—the root is not written, it is common to the whole rubric and initially known—the last byte is marked by the setting of its bit 7 to one or it is followed by a separator, if required by the color set.

Then the whole algorithm includes sequences of delimitation of articles and of comparison byte by byte.

Figure 4:
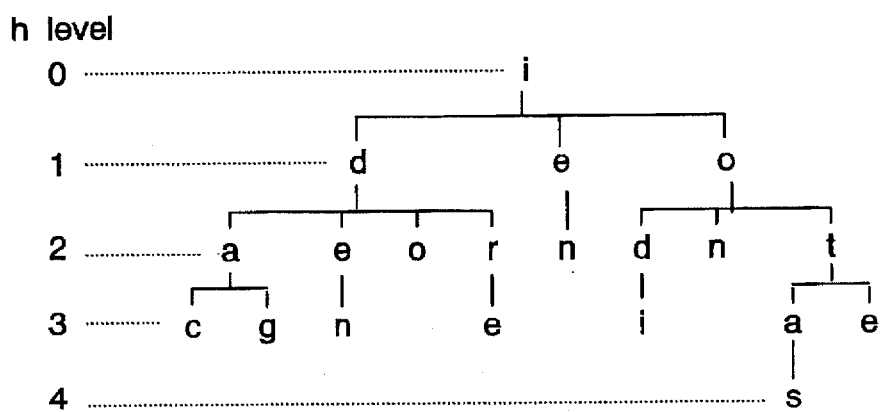
FIG. 4 shows the first tree structure of a dictionary.
Figure 5:
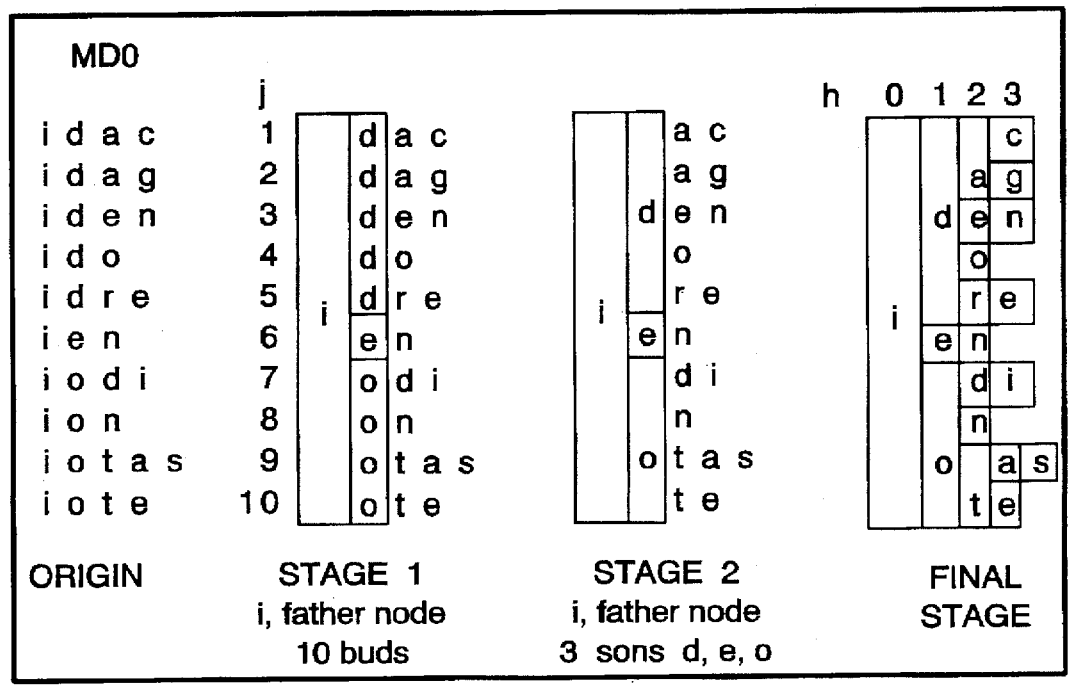
FIG. 5 and FIG. 6 consist of tables explaining the building of a dictionary.

FIG. 4 shows an example of a tree with five levels of depth numbered from 0 to 4 corresponding to ten words whose list beginning with "ida" and finishing with "iote" is labelled "ORIGIN" in FIG. 5.

The different phases of the transformation of the alphabetical list in the tree shown in FIG. 4 are presented in FIG. 5. The letter 'i' makes up the root; the sons of i, for instance d, e and o are displayed at level 1 of the tree. The sons of d: a, e, o, r are displayed at level 2 of the tree; the sons of a: c and g are at level 3.

Then we work out the computing of the gain.

The quantity selected for the measure of the gain is the number of keystrokes saved in the fictive typing of the corpus itself.

In the optimal case of a C context always followed by an S completion, the gain brought by this completion is the product of the length of S, expressed in number of items, by the number of occurences of C in the corpus.

The point is to decide at which level of the tree a completion will be stated. Let us call "initiator" the node preceding a completion.

An only son node can never be an initiator since the gain grows without the increasing of a negative term when you take its father as an initiator. The question which is put when a level h node has got several sons is: is the highest gain got when the initiator is at level h (father level) or at level h–1 (son level) ?

Figure 11:
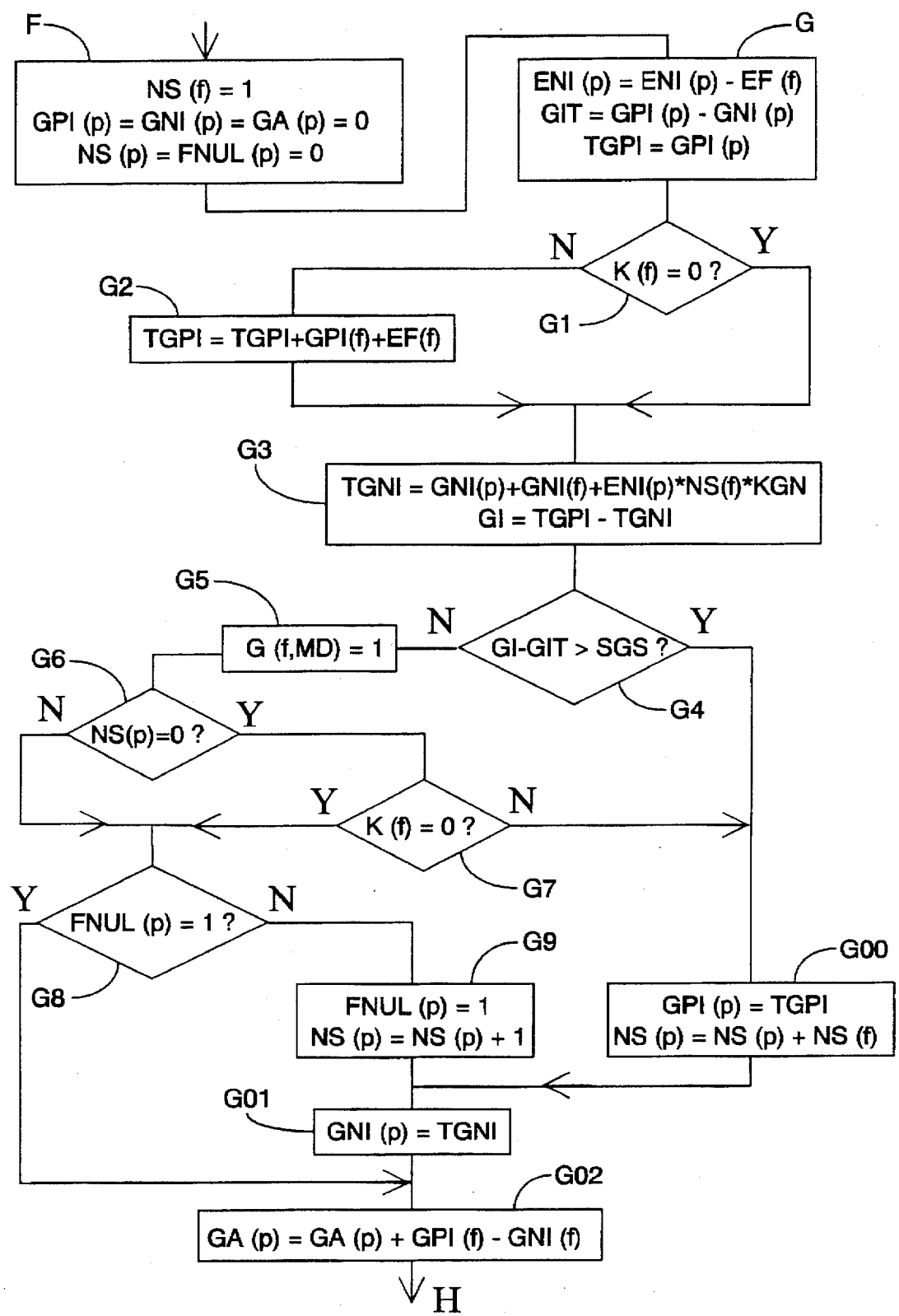
Figure 12:
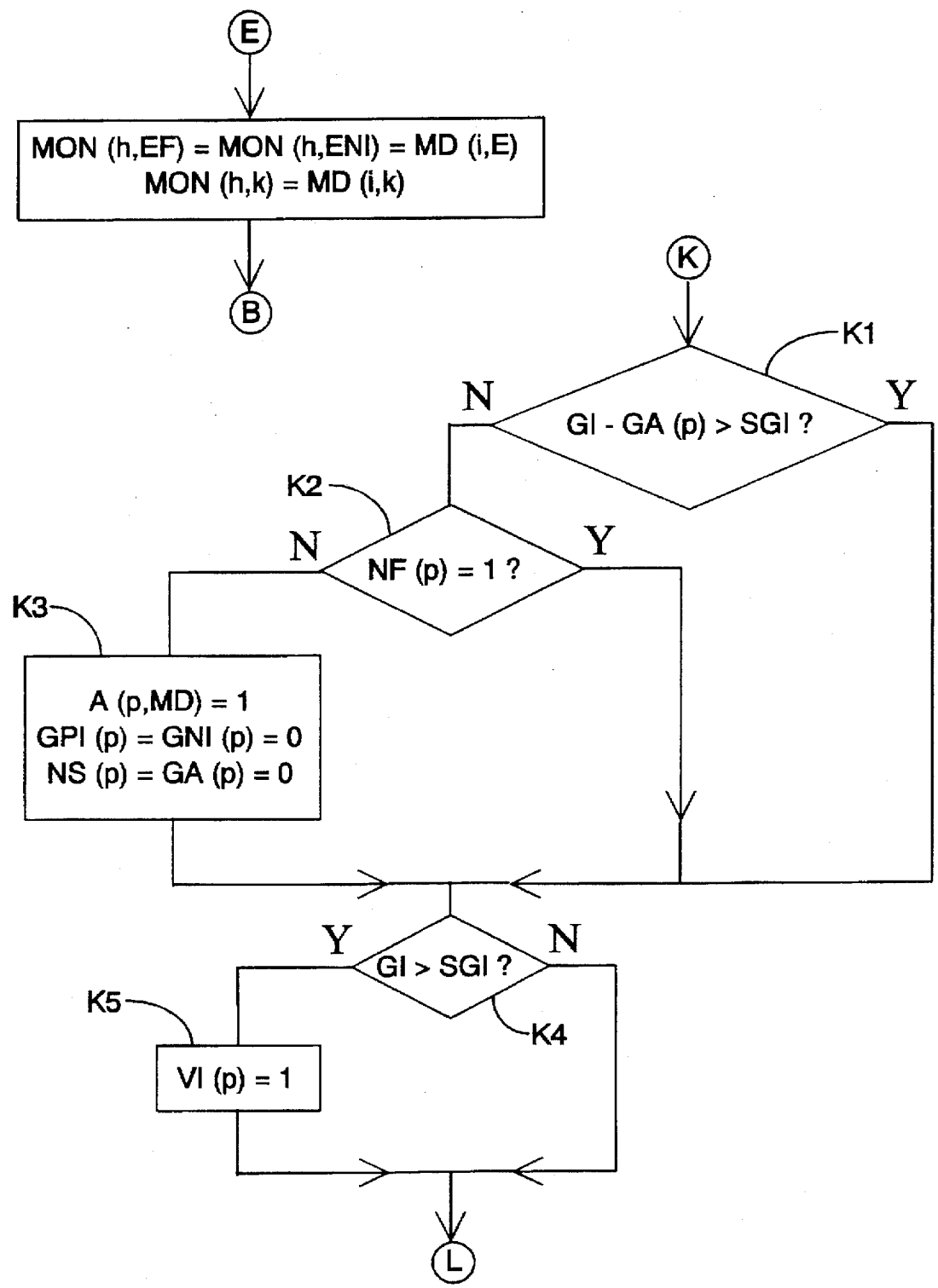

At each level we have to compute:
GI, the gain brought by the completion following a node if it is the initiator.
GA, the sum of the gains brought by the sons of the same node if they are the initiators.
If GA–GI is higher than a given threshold the node is given mark A. Calculations and decisions are shown in the flow chart of the gain (FIGS. 10, 11, 12).

When several completions are possible after an initiator, we have to process two terms of the gain:
GPI, sum of the products of the lengths by the counts of the completions.
GNI, negative term, function of the number of the completions and of their counts; the computing of this term is weighted by the KGN parameter.

If KGN=1 and if the selection and/or the rejection of the completions are done by means of a scrolling key, GNI is equal to the number of strokes of this key. KGN allows the taking into account of the time of reading and selection according to what the user likes better; when KGN increases, the context grows longer and the number of completions after a same context grows less.

Figure 10:
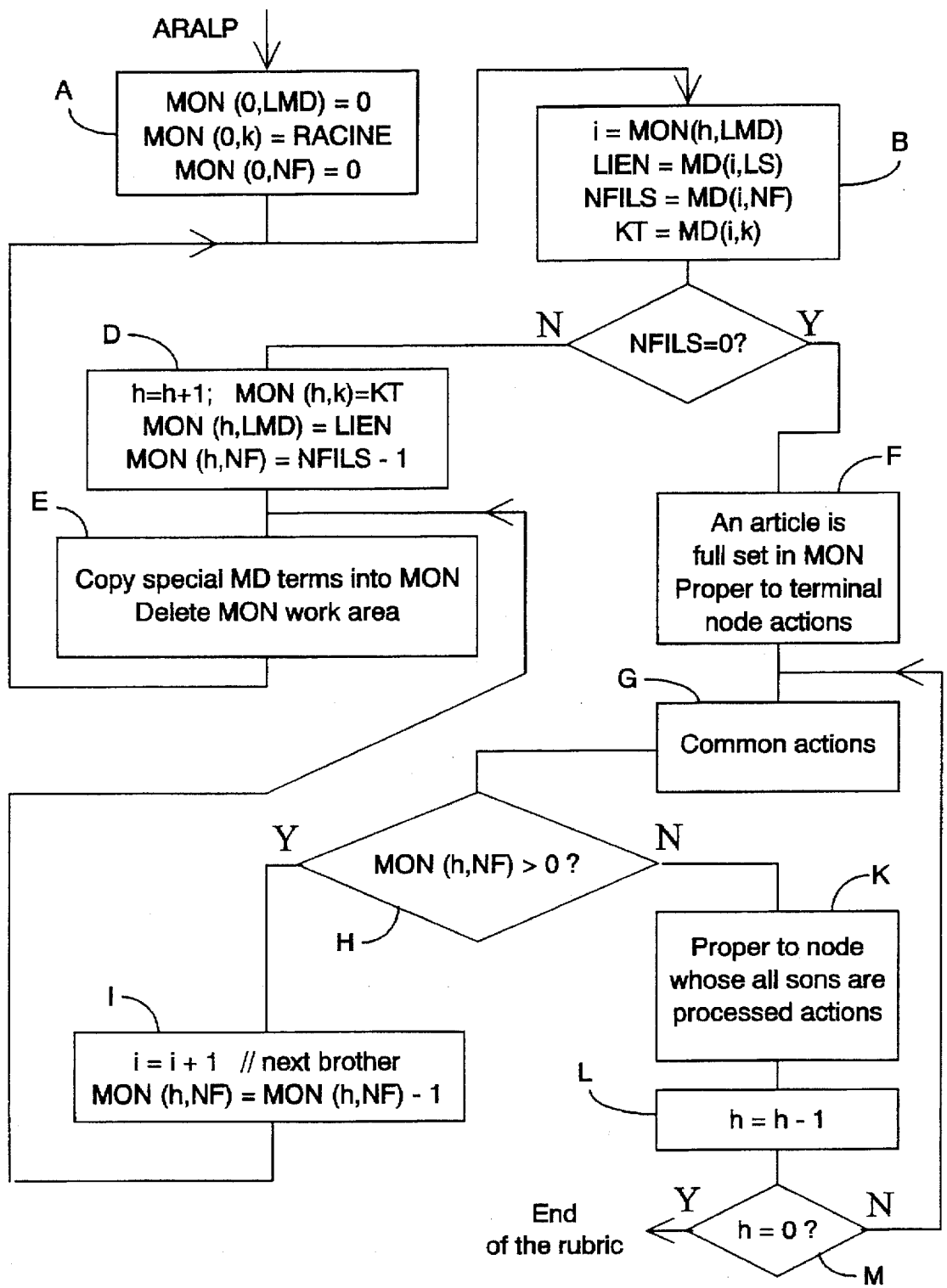

The results are inscribed in the father's MON card, in step G of the ARALP flow chart (FIG. 10). If the individual share of a completion is lower than the SGS threshold, the corresponding son node is given mark G (for Fr. Gel) and the gain is not altered; the count of the given up son will be accumulated in the count of a "null" son managed later.

The algorithm processes the case of an originally null son (i.e. a node whose k term is zero) as well.

If the GI gain of a node is higher than a GSI threshold, it is given mark VI; a node devoid of this mark will be later refused as an initiator.

FIG. 10 is the flow chart of the ARALP procedure that extracts the articles of a tree. The articles are placed in succession in the MON editing table. This procedure is used several times for the computing of the gain and the marking of the tree.

Data known and/or processed by ARALP:
MD( ): tree coding table. A i subscripted card of MD contains:
MD(i,k): color
MD(i,NF): number of sons
MD(i,LA): link or subscript of the first son.
In MD, the sons of the same father are consecutive
MON( ): editing table or stack. A h subscripted card of MON contains:
MON(h,LMD): link, subscript of the corresponding term of MD
MON(h,k): color
RACINE: root of the rubric
LIEN,NFILS,KT: temporary storage of MD terms.

The computing of the gain uses variables stored in two MON consecutive cards: the level h card whose terms are identified by (f) and the level h–1 card whose terms are identified by (p); other variables are in a working area. The results used in the following phase are logical values stored in the MD table.

Variables in the MON table:
EF( ): original count
ENI( ): reduced count, to compute negative term
GPI( ): gain positive term
GNI( ): gain negative term
GA( ): gain if ancestor, sum of the gains of initiator sons
NS( ): number of completions
FNUL( ): logical "existence of a null son"
K( ): color
Variables in the MD table:
Three logical variables are addressed by the LMD link of the MON card; we identify the x term of MD with the notation x(f,MD) if the link belongs to a (f) MON card, x(p,MD) if it belongs to a (p) MON card. These logical variables are:
A( ): ancestor mark
VI( ): validation of initiator mark
G( ): G mark (for "Gel")
Parameters:
SGS: gain threshold of a completion
SGI: initiator threshold
KGN: coefficient of the gain negative term Variables in working area:

GIT, TGPI, TGNI, GI, DGI

FIG. 11 and FIG. 12 show the computing stages situated in the different steps of the ARALP flow chart; the correspondency with FIG. 10 is done through the letter of each step label.

The gain phase leaves three marks: A (completion ancestor), G (completion freezing) and VI (initiator validation).

The "marking" phase will resume work on the tree and will create three new marks, depending on the three previous ones which disappear.

The three new marks are:

V, validation; a node without mark V will be erased later.

I, initiator mark of the last node before a completion

S, completion member mark.

The tree is explored according to the ARALP procedure of FIG. 10. In step F of its flow chart a whole article is set in the MON table and we apply the transformation rules.

An MD card may correspond to an item common to several articles and be several times the object of this processing; therefore the previous marks must remain unchanged and the new ones, initially set to zero, may be set to logical one.

The setting of the marks is made in three passes for an article:

1—A research pass for a A marked node in the article

2—A descending pass from root to ending, setting marks I and S

3—An ascending pass setting the missing V marks

This setting is done according to the following rules:

1—(Pass 1) If an article does not include any A mark, one must be set in the root 2—(Pass 2) Set marks I and V on any node fulfiling those four conditions:
It has no mark A
Its father has mark A
It has mark VI
It has at least one son without mark G 3—(Pass 2) Set marks S and V on any node fulfiling both conditions:
It has neither mark G nor mark I
Its father has mark I or mark S 4—(Pass 3) Set mark V on any node whose son has mark V Then we have to re-sort the null sons.

Let us keep in memory that original 0 color null sons exist, created when an article is the prolongation of another.

When the computing of the gain leaves a G mark in a node the count of this node must be accumulated in the count of a null son.

If it has no null brother, one must be created. For a given father, the original null son, if it exists, and the brothers null trough mark G are fused into a single node in which the counts of its components are accumulated.

Then this null son must be re-sorted according to its count.

The task is directly performed in the MD table. The concerned families are those whose father has the I mark and include several brothers. The sum of the counts of the null sons are accumulated in the EFN variable; afterwards, if necessary, we re-sort the corresponding card in the list of the brothers. The NF term of the father card is corrected later: if there are several null sons, one only is taken into account.

Then we have to make up a final normalization.

The dictionary which has been given marks V,I and S with the re-sorted null sons might be used as it is but its size can be reduced by changing its format.

The nodes which are not completions stay in a tree structure but the content of a card is reduced to four terms: color K, logical I, number of sons NF and link LA.

The completion nodes might remain in the tree structure but take much less room and are used more easily if we go back to a list structure or chain.

An MD coded rubric is transformed into two tables: an MD2 tree table and a completion table.

In order to understand one of the particulars of the final format the "inter-completion" notion must be exposed.

Let us take the example of a primary dictionary containing the articles "technical", "technology", "technical_field", "technical_institution" and "technical_school". Computation and marking give:

"tec" is context; 'c' has mark I

"hn" is completion, but also context; 'n' is linked to the tree structure, with two 'i' and '0' sons 'o' initializes the "logy" completion 'i' initializes "cal_" which is linked to the tree structure by three sons 'f', 'i' and 's', respectively initiators of "ield", "nstitution" and "chool". Here are examples of keyboarding sessions, the parts automatically displayed being underlined:

tec<u>hnical</u>_properties . . .

tec<u>hnical</u>_schools_and_tec<u>hnical</u>_institutions . . .

In the last case, we have only typed "tec", 'i', 's', "and_tec", 'i','i'.

We would say than "logy" is a terminal completion, whereas "hn" and "cal_" are inter-completions. An inter-completion requests its last item to refer to the tree form. The corresponding format is the following:

In a MD2 card: if I=1, the LA term is the subscript of the first completion in the completion table.

In the completion table: the completions generated by the same father form a family; each completion is ended by a delimiter chosen among the following:

TS, end of a terminal completion

TSI, end of an inter-completion. After this delimiter, the terms corresponding to NF and LA of a MD card are written and refer to the tree.

After the dictionary generator, the second module of the system which is the object of this invention is intended to be incorporated into a word processing common system.

The functions of this module are distributed into three parts:

1) The selection and the loading of the dictionary; for a fast operation, the functional dictionary must be entirely stored in the core memory while typing; this function is trivial, using known processes.

2) The usual process of the character input, of the display and of the selection of the completions, corresponding to steps 8,11,6,7 in FIG. 2.

3) The specific process of the dictionary, with its mechanisms of tree tracking and of initialization of the completions (SIGNET procedure) corresponding to step 10 in FIG. 2.

Data known and/or processed in part 2:

Tables and subscripts:

MD( ): Dictionary table. The subset of MD to which we have access here is a table of subscripted bytes.

AS: initial subscript of a completion

CPS: working subscript of a completion

ZPS: ending subscript of a completion

PSI: MD subscript of the tree part of an inter-completion.

If PSI=0, the completion is terminal.

MT: text table

PKC: subscript of a MT term

Variables:

K0: code of the last keyboard input

GK: backup for K0

NS: number of completions

CKS: number of displayed completion items

FS: logical "active completion"

FS0: logical "set up completion"

Constants:

DEFIL: code of the scrolling key

TS: ending code of a terminal completion

TSI: ending code of an inter-completion

TA: size of NF and LA ending an inter-completion.

Figure 13:
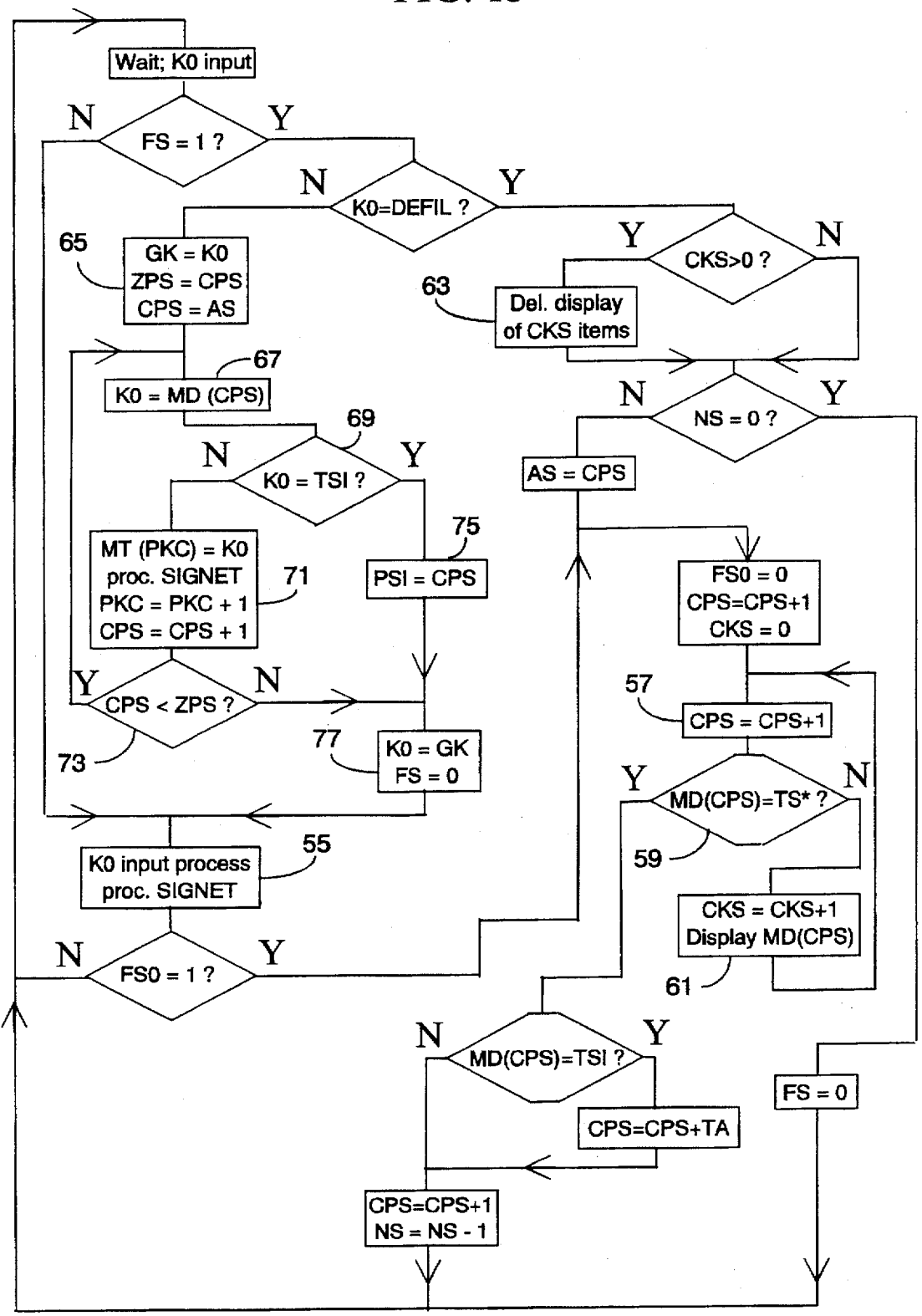
FIGS. 13 and 14 are detailed flow charts of the data input system.

FIG. 13 is a flow chart of the keyboard input and of the specific display.

When the FS flag is off, the input of a K0 typed code is done according to the properties of the host system; the scanning of the dictionary is done by the SIGNET procedure (step 55). If this scanning brings about a completion, SIGNET sets the FS0 flag and provides the address of the completion which is displayed (steps 57,59,61).

When FS is set, a completion has been displayed; if the input code is DEFIL, the completion is deleted (step 63) and replaced by the following one, if any. If the input code is not DEFIL, the completion is inserted into the typed text (steps 65, 67, 69, 71, 73, 75, 77).

Figure 14:
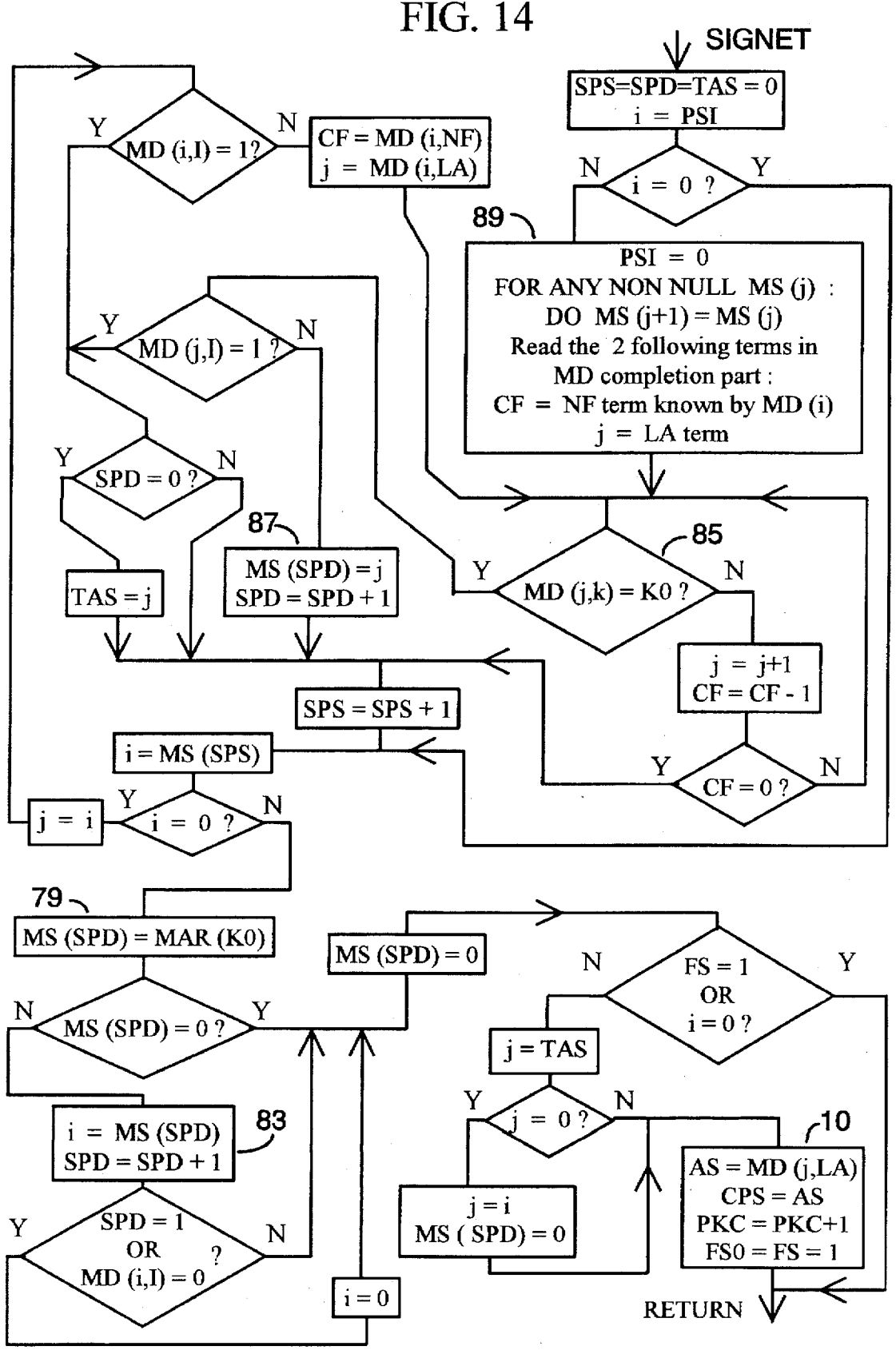

FIG. 14 is the flow chart of the SIGNET procedure. Here are the data:

MD: dictionary table. SIGNET works with these subsets of MD:
  a) MAR, table of rubric subscripts; the term MAR(k) is the base of the subscripting of the root k rubric.
  b) for each rubric, a "tree" part and a "completion" part.

In SIGNET, MD(i,x) denotes the term x of card i, x being one of the following symbols:

k, color

I, logical "completion initiator"

NF, number of sons or of completions

LA, link to the first son or completion.

Shared data:

K0,MT,PKC,PSI,AS,CPS,FS,FS0.

Local variables:

MS( ): "bookmark" table; a bookmark is a subscript of a MD card (tree part)

SPS,SPD: subscripts in MS

CF: counter of sons

TAS: temporary subscript of a completion i,j: subscripts of MD cards.

A bookmark denotes a node of the tree coding the dictionary. At each stroke a processing stage is performed; if K0 corresponds to the root of a non-empty rubric, a bookmark is created and will follow those which are already in MS (steps 79,83) and for each node denoted by a bookmark, K0 is compared to the color of each of its sons (step 85).

If no son has the same color as K0, the bookmark is deleted.

If a son has it, the process depends on variable I in its card.

For I=0, the card subscript is copied into the bookmark; the bookmark goes down a level in the tree (step 87).

For I=1, the path followed in the tree leads to a completion which must be displayed; SIGNET copies the subscript of the completion in AS (through TAS, step 10), sets FS0 and deletes the bookmark whose role is over.

Therefore, at each stage the fulfilled part of the MS table is re-written. Two subscripts are used: SPC, source, and SPD, destination. The MS(SPS) bookmark is read; if it goes down, it is copied into MS(SPD); if it must be deleted, it is not copied.

The I variable is tested for the "senior" bookmark only, always situated at the beginning of the table (subscript 0); the oldest bookmark correspond to the longest context and gets priority.

In the specific case of the end of an inter-completion known by non-null PSI, the link terms to the tree part are at the end of the completion and are processed by a specific sequence (step 89).

The system, object of the invention, may also store and process conventional abbreviations.

An "abbreviation" consist in a X chain named "code" associated to a T chain named "translation". After the typing of the code, the translation is displayed and added to the text. In the system, object of the invention, abbreviation may use the context. For instance the chain "contextual_y" may be the code of "contextual_dictionary". The translation is performed if "contextual_" is entirely typed or if it is itself a completion or a translation.

The best code form is a context C part which will remain unaltered in the preserved text, followed by an arbitrary A code part, typically consisting in one letter, in which case it is not displayed; if A contains several items, they are deleted; eventually the translation only is displayed.

In the functional dictionary the code is a path in a tree of the same form that a context; its last node initializes one completion only. This completion begins with one or two items whose colors do not belong to the character set of the text and mean: delete the n last typed items, n being the length of the arbitrary A code part of the abbreviation. What remains of the completion is the translation.

The building of the abbreviations may be done either automatically or manually.

In the first case, the user gives the dictionary generator a SAB threshold; an abbreviation is built for the chains of the primary dictionary whose product (length multiplied by count) is higher than SAB. The format is arbitrary, the following rules being preferred:

the code exists neither in the corpus nor in any other abbreviation the last item only is arbitrary.

In the case of manual building, the user must define his/her own abbreviations. Here is an elementary embodiment:

select two characters missing in the corpus (for instance § and *; if needed, delete useless ones); one will be the separator, the other the abbreviator.

for each abbreviation write in the corpus: a separator, as many abbreviators as there are items in the code to be deleted, a translation, a separator.

For instance, the abbreviation of "_maximum" into "_mx" will be written as such: "§_mx*aximum§". The dictionary generator identifies the chains included between separators and containing an abbreviator and codes them according to the defined format.

I claim:

1. A computer-aided data entry system, more specifically suitable for texts, comprising stages consisting in:
   a) the input and the storage of a "corpus" including at least a data set similar to the data which must be entered;

b) the building of a primary dictionary extracted from the corpus, whose articles are elementary data chains, independant from word delimiters, occurring several times in the corpus;

c) the generating of a functional dictionary by dividing each article of the primary dictionary into at least a "context" initial part and a "completion" final part so that the gain defined as the product of the completion length by a probability of occurrence in the corpus after the context, would be maximum;

d) when keyboarding, if the last input data coincide with one of the contexts of the functional dictionary, the operator will be offered the automatic insertion of the corresponding completion into the input data.

2. A system according to claim 1, wherein when building the functional dictionary if several contexts are identical, one only is preserved and associated to a list of completions sorted according to the probability order, said various completions being offered to the operator when keyboarding; in all cases, the delimitation and the choice of the completions to be stored in the dictionary are done according to a detailed computation which gives the maximum total gain, the auxiliary keystrokes or other selecting actions being taken into account.

3. A system according to claim 2, wherein in stage d) the various completions are offered in succession in order of decreasing probability and that a command device, such as a board key, allows the scrolling.

4. A system according to claim 1, wherein in stage c) an article extracted from the primary dictionary may be divided into several contexts and completions, the articles being divided so that the total gain would be maximum.

5. A system according to claim 1, wherein in stage c) the value of the gain is corrected by factors taking into account the time and the attention necessary to the operator to select, accept or reject a completion.

6. A system according to claim 1, wherein in stage d) inserting directly the most probable completion after the last typed character and by the fact that a positive act on a command device, for example a board key, is required to delete said insertion.

7. A system according to claim 1, wherein after the coincidence of the last input data and of a context associated to several completions said completions are displayed and may be selected by a direct selecting device such as a mouse, arrowed keys or a set of keys whose numbers are corresponding to the displayed completions.

8. A system according to claim 1, wherein the repetition of stages a), b) and c) with various corpuses containing different data classes and by the selection in a list of the dictionary the best suited to the specialty of the input data.

9. A computer-aided data input system, more specifically suitable for texts, comprising a computer, as a microprocessor, comprising input/output devices, and a bulk storage device, and an editor or word processor stored in the storage device, characterized by a corpus storing ability in the bulk storage said corpus comprising at least a data set belonging to the same class that the data to be input, means for building from the corpus a dictionary including data chains occurring several times in the corpus and for computing and storing in the dictionary the probability of the occurrence, in the data set to be input, of a given chain following the last input characters, and also means convenient to offer to the input operator the inserting in the input data set, of the completion having the greatest probability if said probability is greater than a given threshold.

* * * * *